(12) United States Patent
Maruejouls

(10) Patent No.: US 12,498,359 B2
(45) Date of Patent: Dec. 16, 2025

(54) DETECTION OF CHANGE IN PHYSICOCHEMICAL COMPOSITION OF A LIQUID

(71) Applicant: SUEZ INTERNATIONAL, Paris la Defense (FR)

(72) Inventor: Thibaud Maruejouls, Bordeaux (FR)

(73) Assignee: SUEZ INTERNATIONAL, Paris (FR)

( * ) Notice: Subject to any disclaimer, the term of this patent is extended or adjusted under 35 U.S.C. 154(b) by 490 days.

(21) Appl. No.: 17/927,320

(22) PCT Filed: May 24, 2021

(86) PCT No.: PCT/EP2021/063741
§ 371 (c)(1),
(2) Date: Nov. 22, 2022

(87) PCT Pub. No.: WO2021/239646
PCT Pub. Date: Dec. 2, 2021

(65) Prior Publication Data
US 2023/0341370 A1 Oct. 26, 2023

(30) Foreign Application Priority Data
May 25, 2020 (FR) ...................................... 2005509

(51) Int. Cl.
*G01N 33/18* (2006.01)
(52) U.S. Cl.
CPC ................................ *G01N 33/1886* (2013.01)
(58) Field of Classification Search
CPC ........ G16C 20/90; G16C 20/30; G16C 20/70; G01N 33/1886; G01N 33/18; C02F 1/008; C02F 2209/055; C02F 2209/008; C02F 2209/06; C02F 2209/05; C02F 2209/02

See application file for complete search history.

(56) References Cited

U.S. PATENT DOCUMENTS 8,718,939 B2 * 5/2014 Hamann ............ G01N 33/1886
367/131
2014/0203184 A1 7/2014 Purdy et al.

FOREIGN PATENT DOCUMENTS

| CN | 107 389 888 A1 | 11/2017 |
|----|----------------|---------|
| EP | 3 112 959 A1 | 1/2017 |
| EP | 3 336 505 A2 | 6/2018 |
| FR | 3 024 260 A1 | 1/2016 |

OTHER PUBLICATIONS

Ester, et al., "A density-based algorithm for discovering clusters in large spatial databases with noise", Kdd, vol. 96, No. 34, pp. 226-231, Aug. 1996.

(Continued)

*Primary Examiner* — An H Do
(74) *Attorney, Agent, or Firm* — BakerHostetler

(57) ABSTRACT

A field of measuring and monitoring liquids is provided. More specifically, the improved detection of a change in physicochemical composition of a liquid is provided, based on a set of measurements from sensors collocated in the liquid, and applying data partitioning to the set of measurements. If at least two measurement clusters are identified, an abnormal change in the composition of the liquid is detected.

23 Claims, 5 Drawing Sheets

(56) References Cited

OTHER PUBLICATIONS

McLnnes, et al., "hdbscan: Hierarchical density based clustering", Journal of Open Source Software, vol. 2(11), 205, 2017.

Lloyd, et al., "Methods for detecting change in hydrochemical time series in response to targeted pollutant mitigation in river catchments", Journal of Hydrology, vol. 514, pp. 297-312, 2014.

Aminikhanghahi, et al., "A survey of methods for time series change point detection", Knowledge and Information Systems, vol. 51, No. 2, pp. 339-367, 2017.

Cabrieto, et al., "Detecting correlation changes in multivariate time series: A comparison of four non-parametric change point detection methods", Behavior Research Methods, vol. 49, No. 3, pp. 988-1005, 2017.

Grady, et al., "5. Time Series Analysis", Environmental Chemometrics: Principles and Modern Applciations, vol. 26, pp. 159-206, 2008.

Li, et al., "Automated Water Quality Survey and Evaluation Using an IoT Platform with Mobile Sensor Nodes", Sensors, vol. 17, No. 8, 2017.

\* cited by examiner

DETECTION OF CHANGE IN PHYSICOCHEMICAL COMPOSITION OF A LIQUID

CROSS-REFERENCE TO RELATED APPLICATIONS

This application is a National Stage of International patent application PCT/EP2021/063741, filed on May 24, 2021, which claims priority to foreign French patent application No. FR 2005509, filed on May 25, 2020, the disclosures of which are incorporated by reference in their entirety.

FIELD OF THE INVENTION

The present invention relates to liquid analysis. The invention relates more particularly to the detection of a change in physicochemical composition of a liquid.

BACKGROUND

Water collection and distribution systems may be affected by many anomalies that affect water quality. For example, water may be contaminated by various pollutants that are introduced intentionally or unintentionally by water discharging, the presence of defects in the water supply or connection errors, by material particles that are often deposited in pipelines and suddenly resuspended, through reaction with materials forming the systems, or by bacteria in bacterial growth phenomena. In order to prevent harmful effects that may be caused by contamination, or more generally by the decrease in water quality that may cause discomfort to users (change in color, taste, smell, etc.), it is necessary to detect and characterize any event or situation affecting water quality as quickly and accurately as possible. Problems that alter water quality may also occur in systems, stretches of water or natural watercourses such as lakes, ponds or rivers or sets of stretches of water or natural watercourses. These systems may be affected for example by accidental pollution or the abnormal growth of algae, which significantly degrade their state and prevent them from being used (drinking water, bathing water, etc.).

Some anomalies may result in a rapid change in the physicochemical composition of water. This may for example involve the occurrence of industrial discharge that leads to sudden pollution in a water collection system, or the occurrence of infiltrating clear water. Infiltrating clear water involves the introduction of clear water (that is to say rainwater, groundwater) into a wastewater system. This may occur for example if a pipeline in a wastewater system is pierced and allows clear water to enter the pipeline. The occurrence of infiltrating clear water may lead to problems in terms of sizing wastewater collection systems, create overloads, overflows, or increase the volumes of water to be processed in purification stations. Other anomalies may generate changes in physicochemical composition of a liquid, for example and without limitation: incorrect branching of the wastewater system to a storm water system; incorrect branching or direct discharge of wastewater to a receiving environment (river, lake, sea for example); intrusion of seawater into sanitation systems when these are close to the coast; industrial discharge into a receiving environment (river, lake, sea for example); septic areas that generate hydrogen sulfide (H2S) and/or noxious odors that may generate a quality degradation in a distribution and/or sanitation system.

It is therefore necessary to detect the occurrence of unexpected changes in physicochemical composition of water in a water collection system. More generally, this problem may be encountered on natural watercourses or courses of other types of liquid.

Traditionally, anomalies in a liquid are detected by analyzing measurements from sensors in the liquid. This analysis is generally performed by detecting the sensor measurements exceeding a value threshold. Although these techniques make it possible to detect errors that have already been encountered and characterized on the sensors, they do not make it possible to detect new anomalies. They are also not generally capable of discriminating between a gradual and normal change in the composition of a liquid and a sudden and abnormal change.

There is therefore a need for effective detection of an abnormal change in the physicochemical composition of a liquid, capable of detecting a new anomaly, and of discriminating between a gradual and natural change in the composition of a liquid and a sudden and abnormal change.

SUMMARY OF THE INVENTION

To this end, one subject of the invention is a computer-implemented method for detecting a change in physicochemical composition of a liquid, comprising: receiving measurements from a plurality of collocated sensors for sensing physicochemical variables of said liquid; applying data partitioning to the measurements; checking for the presence of at least two measurement clusters; if at least two measurement clusters are present, detecting the presence of an abnormal change in the physicochemical composition of the liquid; otherwise, detecting the absence of an abnormal change in the physicochemical composition of the liquid.

Collocated sensors are understood to mean sensors taking measurements at one and the same location, that is to say sensors located in one and the same device, for example one and the same multi-sensor probe, or more generally arranged so as to take measurements substantially at the same location.

Data partitioning consists in grouping the data into homogeneous packets or "clusters". A data partitioning algorithm separates the data (here the measurements) into one or more clusters, forming a homogeneous packet of points.

Data partitioning is particularly relevant for determining the presence of an abnormal change in the composition of a liquid. Specifically, in the event of a normal and gradual modification of the composition of the liquid, the corresponding measurements will consist of a single dense packet of points exhibiting a gradual drift. By contrast, in the event of a sudden and abnormal change in the composition of the liquid, the successive measurements will be highly different, and the few points corresponding to the change in composition will be highly spaced from one another, thus separating the data into a plurality of aggregates or clusters.

The presence of at least two measurement clusters therefore gives a good indication that a sudden change has occurred, while the presence of a single measurement cluster gives an indication that the measurements have drifted gradually.

The method therefore makes it possible to determine, very reliably, whether such an abnormal change has occurred, even in the event of a change to a state that is not previously known.

Advantageously, the method comprises smoothing the measurements.

This makes it possible to improve the processing in the following steps. In particular, smoothing the data makes it possible to avoid the presence of aberrant measurements on a sample, or sudden variations on successive samples, for example due to incorrect calibration of the measurement step on a sensor.

Advantageously, the method comprises principal component analysis of the measurements.

Using principal component analysis (PCA) makes it possible to depict the measurements in a space that takes into account the correlations between the measurements from the various sensors. PCA thus makes it possible, on the one hand, to obtain values in a space in which the measured values from the various sensors compensate one another and, on the other hand, to obtain principal components representative of the overall evolution of the physicochemical composition of the liquid.

Advantageously, the principal component analysis comprises multiplying a measurement matrix by a centering-reduction matrix, and then by a transformation matrix, and wherein at least one of the centering-reduction and transformation matrices was computed in a training phase based on measurements from said plurality of sensors.

This makes it possible, for all of the series of measurements, to use the same coefficients of the centering-reduction and transformation matrices. This thus makes it possible always to project the measurements into the same principal component space. Some regions of the principal component space may thus be associated with an anomaly or a state of the liquid.

Advantageously, applying the data partitioning comprises applying a density-based partition.

Density-based data partition methods consist in grouping points step-by-step into a given cluster for as long as a sufficient number of points is close to the current point, that is to say that they group together the points in clusters representing areas with a high local density of points. This type of method is particularly effective for separating coherent sets of measurements separated by sudden abnormal variations.

For example, the methods known as DBSCAN (Density-Based Spatial Clustering of Application with Noise, described by Ester, M., Kriegel, H. P., Sander, J., & Xu, X. (1996, August). A density-based algorithm for discovering clusters in large spatial databases with noise. In Kdd (Vol. 96, No. 34, pp. 226-231)) or HDBSCAN (Hierarchical Density-Based Spatial Clustering of Application with Noise, described by McInnes, L., Healy, J., & Astels, S. (2017). hdbscan: Hierarchical density based clustering. *Journal of Open Source Software*, 2(11), 205) may be used.

Advantageously, applying the data partitioning comprises applying a first data partitioning method and, if the first method does not manage to partition the measurements into at least two clusters, applying a second data partitioning method different from the first one.

This makes it possible, using two different methods, to check that an abnormal change in composition of the liquid has not occurred, and therefore to make the detection more robust.

Advantageously, the first method is a local density-based data partitioning method, and the second method is centroid-based.

Such a combination is particularly robust. Specifically, density-based data partitioning methods are particularly effective in the vast majority of cases, but centroid-based methods generally work well in the few cases in which density-based methods give worse results. For example, the HDBSCAN algorithm may be applied first of all and, if it does not manage to separate the measurements into a plurality of clusters, data partitioning using the k-means method may be used.

Advantageously, the method comprises, if the presence of an abnormal change is detected, categorizing the abnormal change.

This makes it possible to automatically indicate to the user what anomaly has occurred in order to allow said user to undertake corrective actions as soon as possible.

Advantageously, the category of the abnormal change is determined on the basis of a variation direction of the values of the measurements between each of the at least two measurement clusters.

Detecting the types of anomaly on the basis of a variation direction of the values of measurements between the clusters gives a robust and effective anomaly categorization method. In addition, the detection and the categorization of anomalies are independent of the initial state of the water in the collection system.

Advantageously, the method comprises, if the presence of an abnormal change is detected, locating the abnormal change.

This allows the user to determine where the abnormal change has occurred, so as to undertake corrective actions or additional investigations more effectively.

Advantageously, the location of the abnormal change is determined on the basis of a location of at least one measurement positioned, by the data partitioning, at the limit between two clusters.

This location of the abnormal change is particularly relevant, since the measurements at the limits of the clusters correspond to the measurements at the time at which a sudden change occurred. This therefore makes it possible to benefit from the location and/or timestamp information associated with the measurements in order to determine the location of the abnormal change.

Advantageously, the plurality of sensors are located in a mobile probe, the measurements are timestamped, and said location of a measurement is obtained on the basis of the path taken by the probe in the liquid and the timestamp of the measurement.

This makes it possible to locate the abnormal change, even when it is not possible to directly obtain measurement location information, for example in a buried pipeline.

Advantageously, the location of the measurement is obtained through linear extrapolation, over the journey of the probe, of a ratio between the difference between the timestamp of the measurement and the starting time, and the journey time.

This gives a simple and effective method for locating measurements when location information is not available. This location may additionally be performed in any systems without requiring any prior training or computation, and generally gives a satisfactory first approximation of the location of the abnormal change.

Advantageously, the plurality of sensors comprises at least one sensor chosen from a group comprising: a conductivity sensor; a temperature sensor; a pH sensor; an oxidoreduction potential sensor.

Advantageously, the plurality of sensors comprises: a conductivity sensor; a temperature sensor.

The joint presence of a conductivity sensor and of a temperature sensor is particularly effective for detecting infiltrating clear water.

The presence of a pH sensor makes it possible to detect water acidity, variations in which are particularly relevant for detecting an industrial discharge.

The presence of an oxidoreduction potential sensor gives an indication with regard to the amount of oxygen in the water, thereby making it possible for example to detect an abnormal accumulation of organic material that may possibly for example lead to unwanted odors.

The measurements from the sensors may be timestamped in order to be able to associate a measurement day and time with each of the measurements.

Advantageously, the plurality of sensors are collocated in a mobile probe.

A mobile probe has the advantage of being able to take measurements at various points of the liquid continuum.

Advantageously, the mobile probe is a ball float.

Such a ball float has the advantage of being able to take measurements at points of a system that are difficult to access, for example narrow and buried pipelines.

Another subject of the invention is a device for detecting a change in physicochemical composition of a liquid, comprising: at least one communication link to a plurality of collocated sensors for sensing physicochemical variables of said liquid; a processor configured so as to execute the steps of a method according to the invention.

The communication link to the plurality of sensors may be a communication link to a probe comprising the sensors. This may be any communication link allowing a data exchange between a probe and a computing device, for example a wired connection (for example via an optical fiber, a USB port, etc.) or a radio connection (Wi-Fi, Bluetooth, 4G, 5G, nbiot, LORA, etc.). This makes it possible to recover measurements from one or more probes in the liquid.

The communication link to the sensors may also be a link inside the device. This is the case for example when a probe is equipped both with sensors and with a processor for processing the measurements.

Such a device makes it possible to implement the anomaly detection method according to the invention based on measurements from sensors in a liquid.

Another subject of the invention is a probe for detecting a change in physicochemical composition of a liquid, said probe comprising: a plurality of sensors for sensing physicochemical variables of said liquid; at least one communication link to a device according to the invention.

Such a probe makes it possible to collect measurements from sensors in the liquid and to send them to a computing device that will be able to perform the anomaly detection.

Advantageously, the probe is designed to float in the liquid.

Such a floating probe has the advantage of being able to take measurements at points of a system that are difficult to access, for example narrow and buried pipelines.

Another subject of the invention is a system for detecting a change in physicochemical composition of a liquid, comprising: a device for detecting a change in physicochemical composition of a liquid according to the invention; at least one probe for detecting a change in physicochemical composition of a liquid, comprising a communication link to said device.

Such a system makes it possible to have a probe that takes measurements in the liquid, and that sends the measurements to the computing device, which performs the computations for determining the presence of a change in physicochemical composition of the liquid based on the received measurements. This therefore makes it possible to have a probe of limited size and low energy consumption while still benefiting from the computing power of a dedicated computing device.

Advantageously, the system comprises a graphical interface allowing a user to define at least one parameter for detecting the change in physicochemical composition of the liquid.

This graphical interface allows the user to perform tests in order to identify the most relevant parameter values for executing the method.

Another subject of the invention is a computer program product for detecting a change in physicochemical composition of a liquid, comprising program code instructions recorded on a computer-readable medium for executing a method according to the invention when said program product is executed on a computer.

Such a computer program product makes it possible, when it is executed on a computer, to execute the method according to one of the embodiments of the invention, and therefore to effectively detect the occurrence of an abnormal change in physicochemical composition of a liquid.

BRIEF DESCRIPTION OF THE DRAWINGS

Other features, details and advantages of the invention will become apparent upon reading the description provided with reference to the appended drawings, which are given by way of example and in which, respectively.

DETAILED DESCRIPTION

Figure 1A:
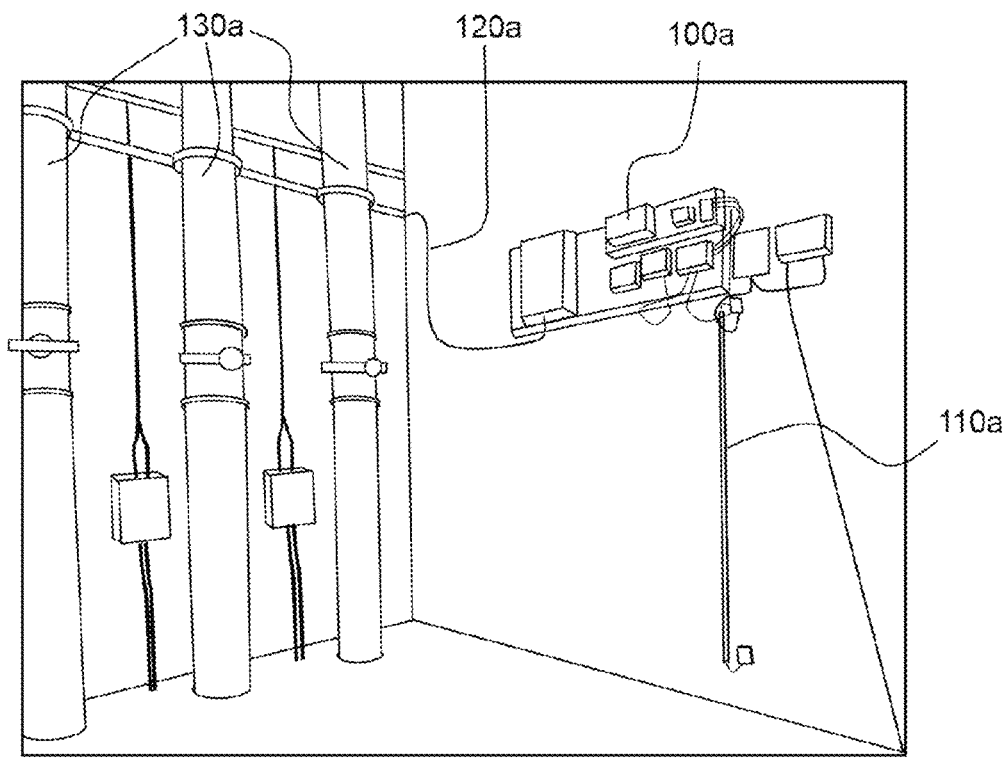
FIG. 1a shows an example of a fixed probe in a wastewater collection system, according to one set of modes of implementation of the invention.

FIG. 1a shows an example of a fixed probe in a wastewater collection system, according to one set of modes of implementation of the invention.

The probe 100a comprises sensors for detecting abnormal changes in the physicochemical composition of water in a wastewater collection system. The probe may be placed at any location in a wastewater collection system, for example in a reading station, in a storm basin, in a storm spillway, in the vicinity of a purification station or at any other point.

The probe 100a is connected to pipelines 130a of the wastewater collection system, for example by a set of sensor cables 120a or connected directly to the system (insertion), and is supplied with electricity 110a via an electricity distribution grid or by a battery.

The probe 100a may comprise a plurality of sensors for sensing physicochemical variables of the wastewater collection system. For example, the probe 100a may comprise at least one or more sensors chosen from among at least, but without limitation:
- a water conductivity sensor; and/or
- a temperature sensor; and/or
- a pH sensor; and/or
- an oxidoreduction potential sensor (or redox sensor).

The probe 100a thus makes it possible, in one set of embodiments of the invention, to take measurements of a set of parameters for detecting an abnormal evolution of the physicochemical composition of water, liable to jeopardize the water quality at a point of the wastewater collection system.

In one set of embodiments of the invention, the probe 100a comprises a communication link to a computing device in order to transmit the measurements from the embedded sensors. The communication link between the probe and the sensor may be of various types. For example, the probe may comprise a wired or radio connection to a server in order to send the measurements to a server that is configured so as to detect anomalies in the wastewater collection system. In these embodiments, the probe takes the measurements and then sends them to a computing device, which will process them in order to detect the occurrence of an abnormal change in the water composition.

In one set of embodiments of the invention, the probe comprises a processor configured, based on the measurements from the sensors, so as to detect changes in the physicochemical composition of water. In these embodiments, the probe therefore both takes the measurements and processes them.

Some examples of detecting a change in composition using a processor will be given below, the anomaly detection and characterization techniques described with reference to the following figures being applicable to a processor embedded in the probe 100a.

Although the probe 100a represents one example of a probe in a wastewater collection system, such probes may also be deployed in a water distribution system, water in a natural environment, for example in a lake, pond, river or in any other aquatic system, possibly at different depths. A probe such as the probe 100a may also be deployed in a liquid other than water. In general, it may be installed in a liquid continuum.

Figure 1B:
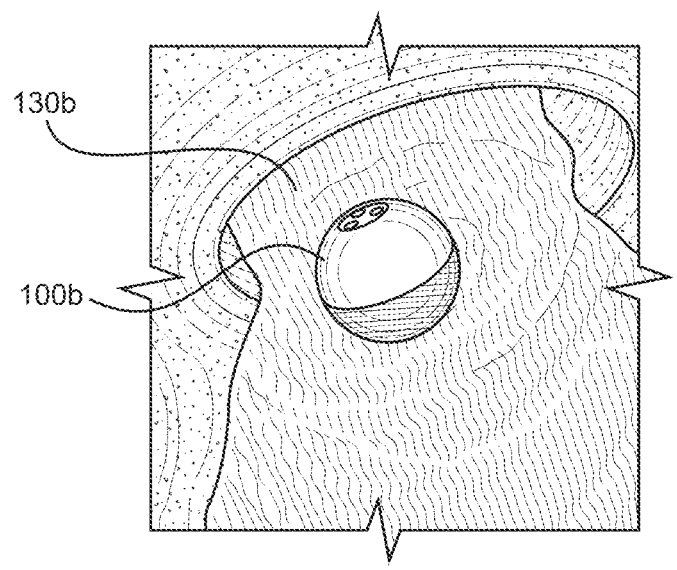
FIG. 1b shows an example of a mobile probe in a wastewater collection system, according to one set of modes of implementation of the invention.

FIG. 1b shows an example of a mobile probe in a wastewater collection system, according to one set of modes of implementation of the invention.

Fixed probes such as the probe 100a are effective for taking measurements at a fixed point of the system. However, it may be necessary, in order to more accurately locate an anomaly, to benefit from measurements over a larger number of points of the system. Mobile probes may be used for this purpose.

The probe 100b is in the form of a ball float, able to follow the movement of water in a wastewater collection system. The probe 100b has the advantage of being of reduced size, and may thus move naturally within pipelines such as the pipeline 130b, including in locations that are difficult to access or in narrow pipelines.

The probe 100b is equipped with a battery and with a plurality of sensors. As in the case of the probe 100a, the probe 100b may be equipped with various sensors, such as those outlined with reference to FIG. 1a.

In one set of embodiments of the invention, the probe 100b is equipped with a processor allowing it to process the measurements from the sensors. It then both takes measurements and detects any abnormal change.

In one set of embodiments of the invention, the probe 100b is additionally equipped with a communication link to a computing device, allowing it for example to transmit the data from the sensors to the computing device that will be able to process these measurements. Various communication links may be used. For example, the probe 100b may connect to a computer via a Bluetooth or Wi-Fi link or a USB port. The probe 100b may also use a data link via a mobile telephony network, such as a 4G or 5G network. In these embodiments, the probe therefore takes measurements and then sends the measurements to the computing device, which processes them in order to detect any abnormal change in composition of the liquid.

In one set of embodiments of the invention, the probe 100b may be equipped with geolocation means. This makes it possible to associate, with each measurement, in addition to the timestamp, geolocation information for locating an anomaly in the wastewater collection system.

Various geolocation means may be used. For example, a satellite positioning system (or GNSS—Global Navigation Satellite System) such as the GPS (Global Positioning System), Galileo or Glonass system may be used. The probe 100b may also be geolocated via a mobile telephony network, or embedded location systems such as inertial measurement units equipped with accelerometers, a gyroscope and electromagnetometers or through the identification of previously georeferenced characterizable points (view, room) or any other appropriate means.

The probe 100b is given only by way of example, and other mobile probes may be used. For example, although the mobile probe 100b is able to drift, without a motor, in a wastewater collection system, other probes may be equipped with a motor in order to move within a wastewater collection system. Likewise, a mobile probe may have various forms, such as the form of a boat and a submarine.

Lastly, although the mobile probe 100b has been shown in a wastewater collection system, the invention is also applicable to mobile probes in other contexts, such as watercourses or systems for collecting a liquid other than water. The mobile probe 100b may also be deployed in a distribution system rather than a collection system, for example in a water distribution system. In general, a probe such as the probe 120b may therefore move in a liquid continuum.

Figure 2:
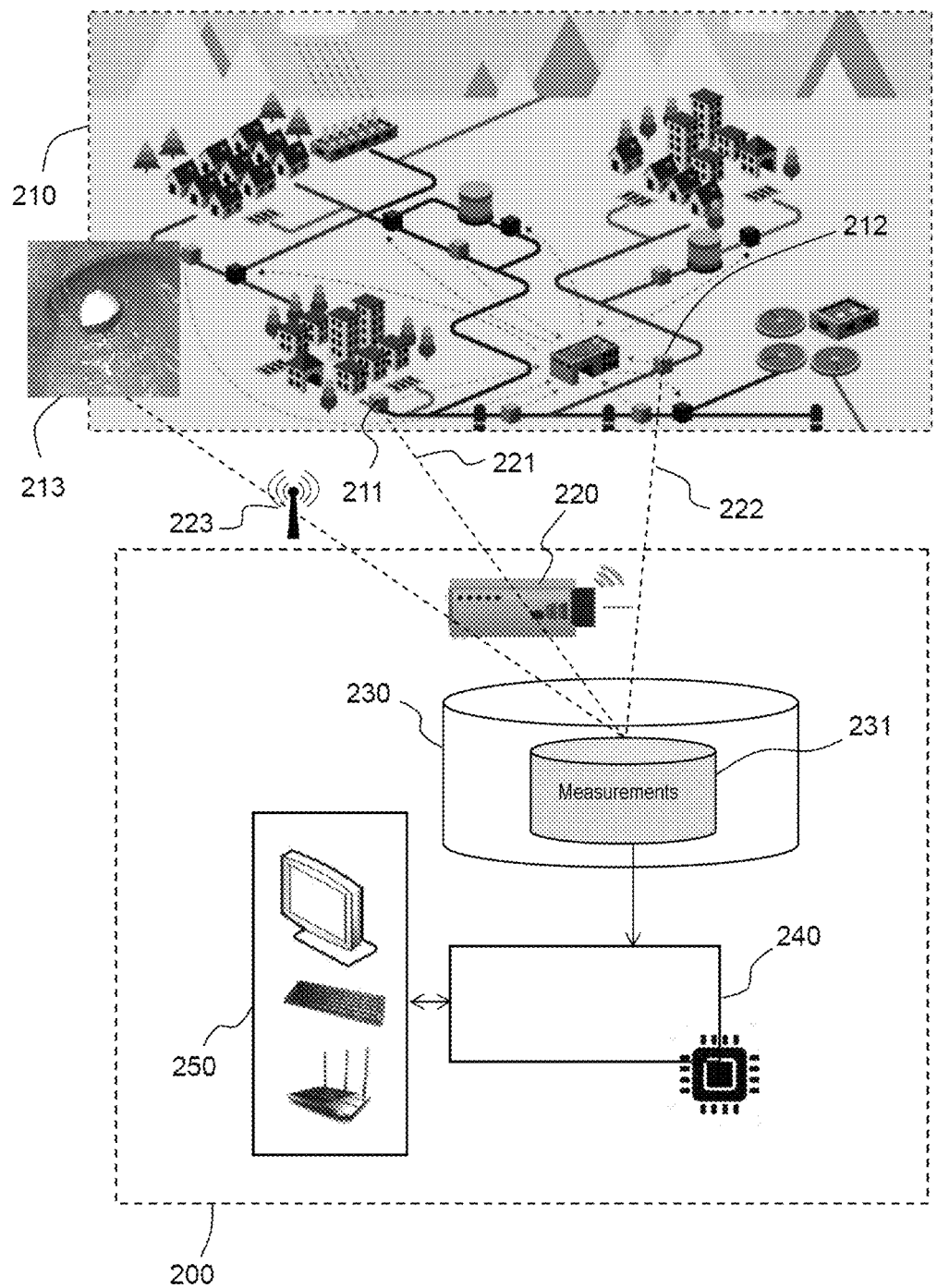
FIG. 2 shows an example of a device for detecting a change in physicochemical composition of a liquid according to one set of modes of implementation of the invention.

FIG. 2 shows an example of a device for detecting a change in physicochemical composition of a liquid according to one set of modes of implementation of the invention.

The device 200 is configured so as to receive measurements from sensors and to process them in order to detect a change in physicochemical composition of a liquid.

To this end, the device has at least one communication link 221, 222, 223 to a plurality of collocated sensors 211, 212, 213 for sensing physicochemical variables in a liquid continuum, that is to say to at least two sensors located in the same device, or the same probe, such as the probe 100a or 100b or, more generally, at least two sensors arranged so as to be able to take measurements substantially at the same location.

The measurements may be timestamped and/or provided in fixed time steps, that is to say that a given duration may elapse between each measurement. If the various sensors use a different time step, the measurements may be preprocessed, for example via an interpolation, so as to provide a measurement from all of the sensors at each measurement time, the measurement times being separated by fixed time steps.

In the example of FIG. 2, 3 probes are arranged in a wastewater collection system 210: two fixed probes 211, 212 and a mobile probe 213. Each probe comprises at least two sensors. For example, the probes may comprise the combinations of sensors discussed with reference to FIG. 1*a*.

Although FIG. 2 shows sensors in a wastewater collection system, the invention is also applicable to sensors in a water distribution system, in a natural environment, for example in a lake, a pond, a river, or more generally in an aquatic system. The sensors may also be located in a liquid other than water. Although FIG. 2 shows three probes each comprising a set of sensors, the processing of the measurements is performed separately on the measurements from each probe. Specifically, the invention is applicable to measurements from collocated sensors, that is to say sensors located in the same device, housing or probe, or more generally arranged so as to perform measurements substantially at the same location. The device 200 may thus act on measurements from a single probe, or in parallel on measurements from a plurality of probes.

The communication with the pluralities of sensors 211, 212, 213 may be performed through a measurement acquisition system, for example a SCADA platform (Supervisory Control And Data Acquisition: large-scale control and remote management system for the real-time processing of a large number of remote measurements and the remote control of technical installations). In one set of embodiments of the invention, the communication links 221, 222, 213 are a radio link with a receiver 220. Many other implementations of the communication links are possible. For example, the pluralities of sensors 211, 212, 213 may send values to a hub that is connected, via a radio link or a cellular telephone link, to a modem in the device 200. Some parts of the communication link may be formed by wired links. The type of link may also depend on the fixed or mobile nature of the sensors. For example, in the case of mobile sensors 213, the communication link 223 may be a Bluetooth, Wi-Fi or USB link. A person skilled in the art may easily define the relevant communication links for a given usage case, for example by selecting one of the communication links well known in the field of water collection and distribution system management. According to various embodiments of the invention, the device 200 may belong to various types of computing device. For example, the device 200 may be a personal computer, a workstation, a server, a digital tablet or any other suitable device.

The system 200 furthermore comprises a storage medium 230. In the example shown in FIG. 2, the storage medium is located in the device 200. In other embodiments of the invention, the storage media may be located outside the computing device. For example, this may be a shared hard drive, or a remote database, accessible through requests by the computing device. In the example shown in FIG. 2, the storage medium comprises a measurement database 231. The measurement database 231 is used to store measurements from the pluralities of sensors 211, 212, 213. The measurements comprise notably values of physicochemical variables measured by the one or more pluralities of sensors 211, 212, 213. In one set of embodiments of the invention, they may also comprise a timestamp with the date/time of the measurements and/or a geolocation of the measurements. The storage medium 230 may for example be a hard drive, a solid-state reader, a flash memory or any other known storage type.

The device 200 comprises a processor 240 for processing the measurements from the sensors. In one set of embodiments of the invention, various types of processor may be used within the scope of the invention: the processor may be for example a microprocessor, a microcontroller or a digital signal processor (or DSP). The processor is not limited to any processor type or architecture, and may be configured so as to execute operations by loading executable code elements. The processor may be located either in a probe comprising the at least one sensor, in order to directly process the measurements from the sensors, or in a personal computer or remote server to which the probe transmits its measurements.

The device 200 may also comprise a set of inputs/outputs 250 such as a screen, a keypad or a router. These inputs/outputs may for example be used to provide a user with a graphical interface for defining at least one parameter for detecting the change in physicochemical composition of the liquid and/or to display the result of the detection.

The processor 240 is configured so as to receive measurements from at least one of the pluralities of sensors 211, 212, 213. In the example of FIG. 2, the processor is configured so as to read the measurements from the measurement database 231. However, the processor 240 may also receive the measurements in another way, for example by directly receiving the measurements from the sensors and by storing them in a local working memory.

The processor is configured so as to perform the steps of a method for detecting a change in physicochemical composition of a liquid according to the invention. Such a method is described in more detail with reference to FIG. 3.

More generally, the device 200, the probes 211, 212 and 213 and the communication links 221, 222, 223 form a system for detecting a change in physicochemical composition of a liquid for taking a measurement in the liquid, and then processing the measurements in order to detect an abnormal change.

It should be noted that, although FIG. 2 shows an example in which probe measurements are transmitted remotely to a computer that performs the processing, the invention is also applicable to processing of the sensor measurements directly in the probes, for example the probes 100*a* and 100*b*. In this case, the communication link to the sensors is a link inside the probe, for example electrical wires for transmitting the measurements from the sensors to a processor in the probe.

Figure 3:
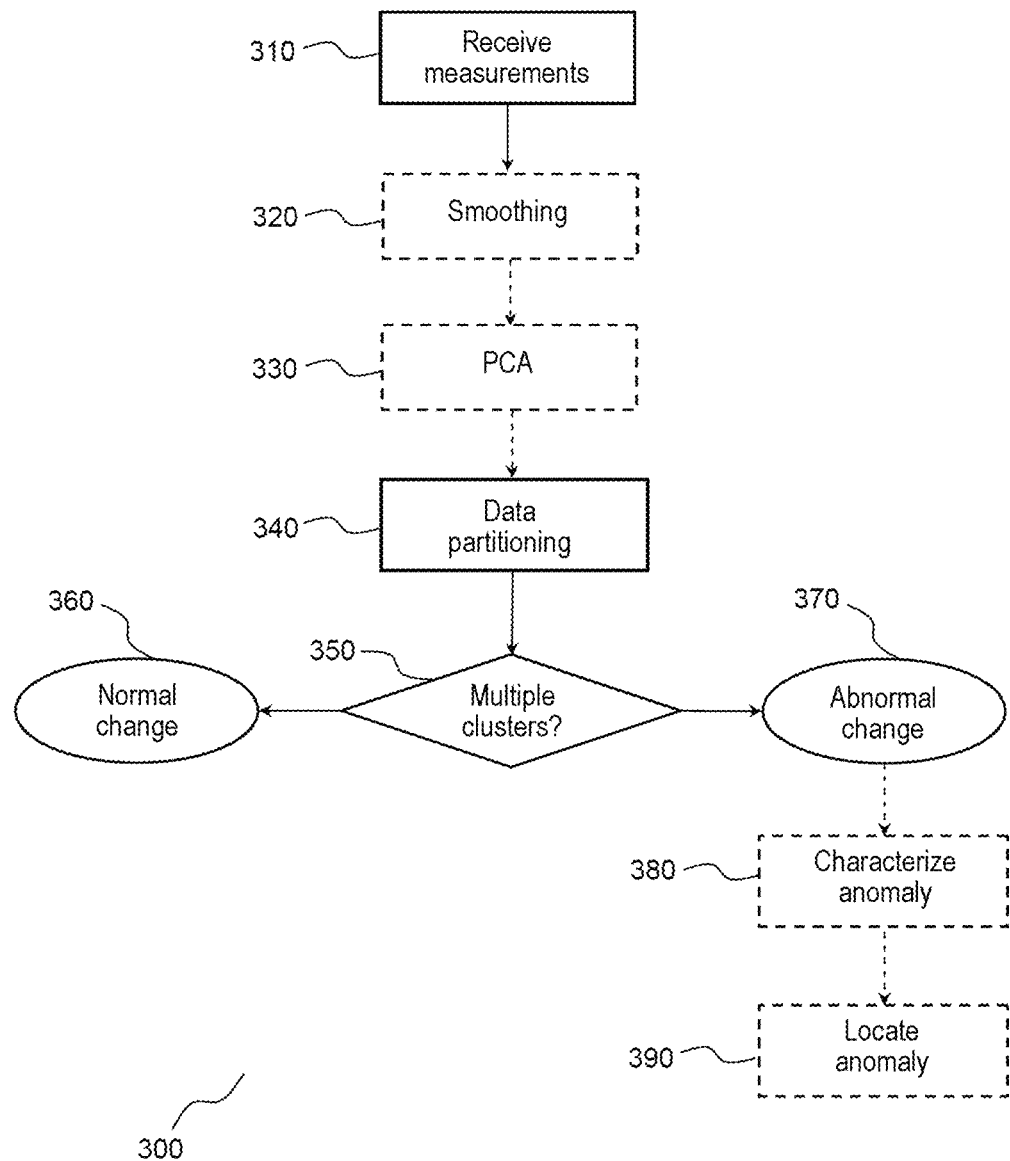
FIG. 3 shows an example of a computer-implemented method for detecting a change in physicochemical composition of a liquid according to one set of modes of implementation of the invention.

FIG. 3 shows an example of a computer-implemented method for detecting a change in physicochemical composition of a liquid according to one set of modes of implementation of the invention.

The method 300 comprises a first step 310 of receiving measurements from a plurality of collocated sensors for sensing physicochemical variables in a liquid continuum.

All of the embodiments discussed with reference to FIGS. 1*a*, 1*b* and 2 are applicable to this method. The sensors may in particular be collocated in a probe such as the probes 100*a*, 100*b*, 211, 212, 213.

In one set of embodiments of the invention, the method 300 comprises a second step 320 of smoothing the sensor measurements.

This step makes it possible to improve the processing in the following steps. In particular, smoothing the data makes it possible to avoid the presence of aberrant measurements on a sample, or sudden variations on successive samples, for example due to incorrect calibration of the measurement step on a sensor.

The smoothing is preferably performed in parallel, in successive time windows, on the measurements from each sensor of the plurality of collocated sensors, or on a subset thereof. For example, the smoothing may be performed using a sliding average of the measurements from each sensor. The number of values on which the sliding average is performed may be defined in various ways. For example, the sliding average may be performed on 10 measurements. The number of measurements on which the sliding average is performed may be identical for all of the sensors, or specific to each of them. Lastly, the sliding average is just one example for the possible smoothing of the values. Other smoothing methods may be used, such as a linear or polynomial regression, a Bézier curve, or a Savitzky-Golay algorithm.

The smoothing step is however not essential to implementing the method according to the invention. For example, if the sensors are calibrated correctly and taking the measurement does not lead to any sudden variation between two samples, the smoothing step is not necessary.

In one set of embodiments of the invention, the method 300 comprises a step of principal component analysis (PCA) of the measurements.

If a step 320 of smoothing the measurements is employed, the PCA is applied to the smoothed measurements.

Using a PCA makes it possible to depict the measurements in a space that takes into account the correlations between the measurements from the various sensors. PCA thus makes it possible, on the one hand, to obtain values in a space in which the measured values from the various sensors compensate one another and, on the other hand, to obtain principal components representative of the overall evolution of the physicochemical composition of the liquid.

Using a PCA is particularly relevant when the number of sensors is high, for example more than 3 sensors. PCA step 330 is however not an essential feature of the invention. In particular, it is not necessary for a small number of sensors, for example 2 or even 3 sensors.

In one set of embodiments of the invention, the PCA is performed by multiplying a matrix representation of the measurements (representing for example one sensor per row, and one time step per column) by a centering-reduction matrix, and then multiplying the result by a transformation matrix. The centering-reduction matrix makes it possible to obtain centered reduced variables. The transformation matrix makes it possible to transform these variables into principal components.

The coefficients of the centering-reduction and transformation matrices may be computed on the basis of just the measurements obtained in step 310. This then gives principal components that are a very true representation of the instantaneous measurements.

In one set of embodiments of the invention, on the other hand, the coefficients of at least one of the centering-reduction and transformation matrices were computed in a training phase, based on previous measurements from said plurality of sensors.

This makes it possible, for all of the series of measurements, to use the same coefficients of the centering-reduction and transformation matrices. This thus makes it possible always to project the measurements into the same principal component space. Some regions of the principal component space may thus be associated with an anomaly or a state of the liquid.

In practice, a training base may be formed with time series of values from the plurality of sensors, and the coefficients of the matrices may be determined so as to optimize the centering-reduction and the transformation into principal components on the training base. Next, the centering-reduction and transformation matrices are applied to the new data. It should be noted that said plurality of sensors for the training phase may correspond to the same physical sensors, that is to say that the training measurements are obtained from the same probe as the measurements obtained in step 310, or by a plurality of sensors of the same model, for example sensors of a probe identical to the probe using which the measurements are obtained in step 310.

The method 300 then comprises a step 340 of applying data partitioning to the measurements.

If a principal component analysis step 330 is used, the data partitioning is applied to the principal components. If just a step 320 of smoothing the measurements is used, step 340 is applied to the smoothed measurements.

In one set of embodiments of the invention, the data partitioning comprises applying a density-based partition.

In one set of embodiments, centroid-based data partitioning methods may be used. For example, k-means or k-medoids methods may be used.

In one set of embodiments of the invention, a plurality of method types may be used in succession. For example, a first method may be used and, if it does not manage to identify at least two separate clusters, a second method may be used.

For example, a first density-based data partitioning method may be applied and then, if this first method has not managed to separate the measurements into at least two clusters, a second centroid-based data partitioning method may be used.

The method then comprises a step 350 of checking for the presence of at least two measurement clusters.

If at least two measurement clusters are present, an abnormal change 370 in the physicochemical composition of the liquid is detected. Otherwise, the absence 360 of an abnormal change in the physicochemical composition of the liquid is detected.

As indicated above, data partitioning gives an excellent indication of the occurrence of a sudden and abnormal change in the composition of the liquid. The method therefore makes it possible to determine, very reliably, whether such a change has occurred, even in the event of a change that is not previously known.

In the event of detecting an abnormal change 370, the method 300 comprises, in one set of embodiments of the invention, a step 380 of characterizing the abnormal change.

This step consists in automatically determining the type of abnormal change. For example, if this involves infiltrating clear water or an industrial discharge. This makes it possible to automatically indicate to the user what anomaly has occurred, in order to allow said user to undertake corrective actions as soon as possible.

Step 380 may be performed in various ways. For example, some regions of the measurement space (or, where applicable, of the principal component space) may be associated with a given anomaly. This may be performed by training a supervised learning engine such as a neural network or a random forest on an annotated history of measurements of abnormal changes in the composition of the liquid.

Knowing certain types of change may also be used to generate automatic anomaly detection rules. For example, (composite or non-composite) variables evolve in characteristic directions of the disruption. For example, when the value clusters of Principal Components 1 and 2 move in the positive direction, the observed disruption corresponds to an industrial discharge. It is therefore possible, either by manually defining the rules or by learning them automatically, to associate an abnormal variation direction of the measurements or principal components and/or a region of the measurement or principal component space with an anomaly, and thus to categorize the detected disruption.

This step 380 is however not essential to the method 300. Specifically, in many usage cases, the method simply makes it possible to determine that an abnormal change in the composition of the liquid has occurred, leaving the user with the task of refining the diagnosis, and where applicable conducting additional investigations.

In one set of embodiments of the invention, the method 300 comprises, if an abnormal change in the composition of the liquid is detected, a step 390 of locating the abnormal change.

This step allows the user to determine where the abnormal change has occurred, in order to undertake corrective actions or additional investigations more effectively.

This step 390 is however not essential to the invention: in many cases, the mere information according to which an abnormal change has occurred is sufficient for the user to undertake additional investigations or corrective actions. Likewise, even without the precise location of the abnormal change, a user generally benefits from location information allowing said user to undertake additional analysis or corrective steps. For example, in the case of a fixed probe such as the probe 100a, the detection of an abnormal change in the composition of the liquid necessarily implies that the change has occurred upstream of the probe on the system; if a mobile probe such as the probe 100b moves over a system of limited size, the mere information according to which an abnormal change has occurred on the system allows the user to undertake additional actions.

The abnormal change may be located 390 in various ways.

In one set of embodiments of the invention, the location of the abnormal change is determined on the basis of the location of at least one measurement positioned, by the data partitioning, at the limit between two clusters.

Figure 4:
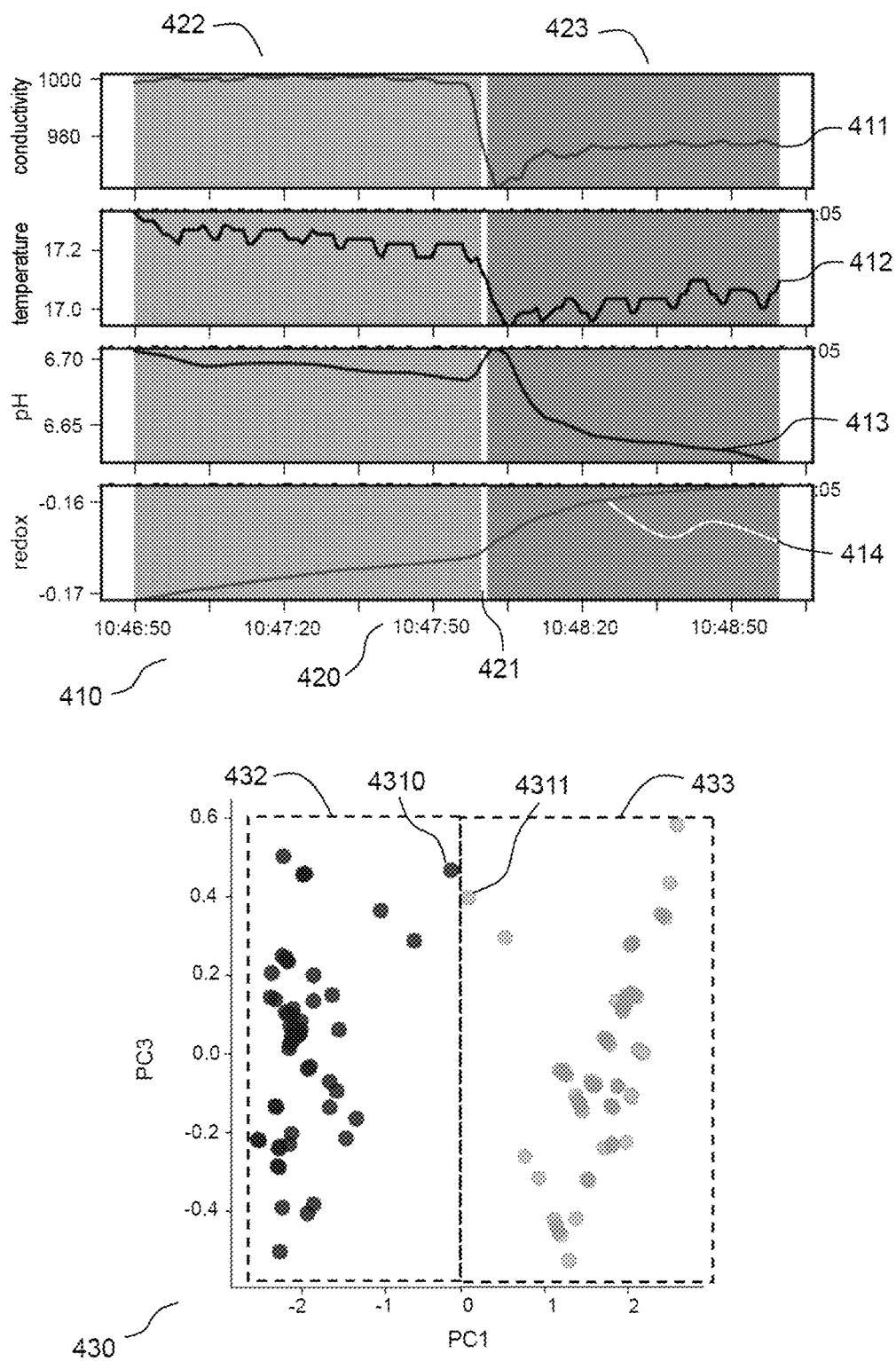
FIG. 4 shows a first example of partitioning data from measurements from physicochemical measurement sensors, in one set of modes of implementation of the invention.
Figure 5:
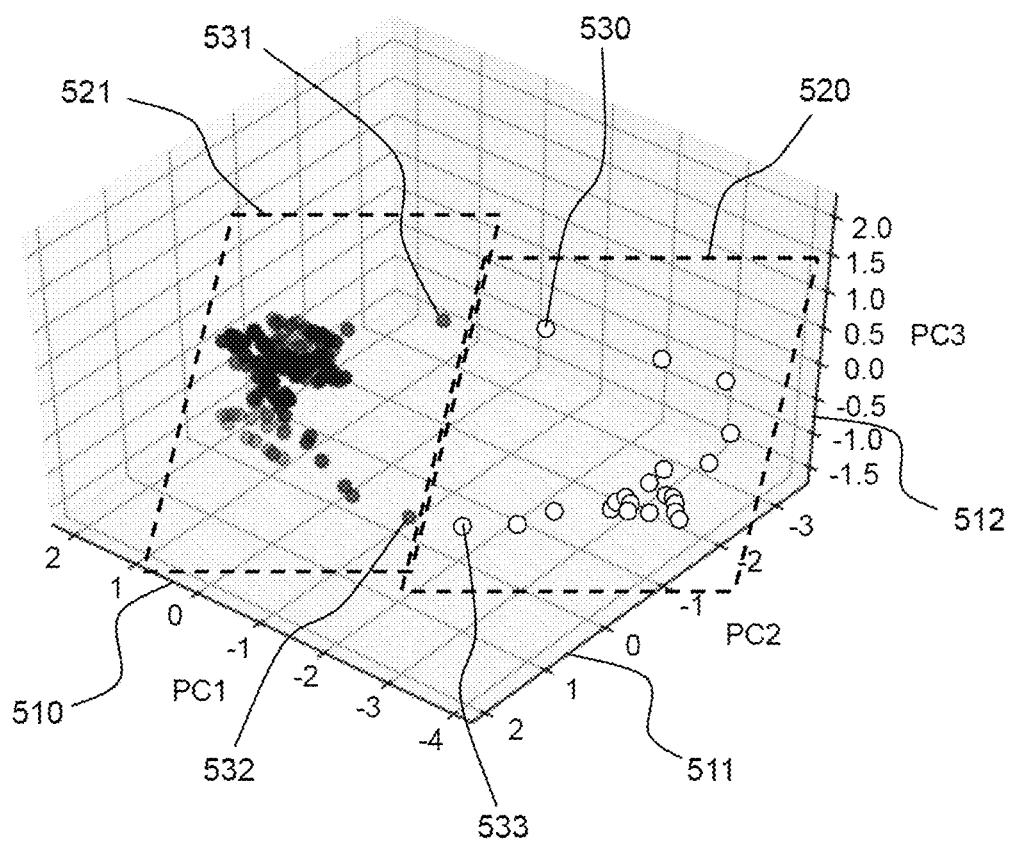
FIG. 5 shows a second example of partitioning data from measurements from physicochemical measurement sensors, in one set of modes of implementation of the invention.

More generally, as will be illustrated in FIGS. 4 and 5, data partitioning makes it possible to separate the measurements into clusters within which the measurements vary gradually and are close to one another. By contrast, the clusters are separated from one another by significant differences between each measurement. A measurement at the limits of a cluster therefore corresponds to the measurement in a cluster closest to a neighboring cluster. The location of an abnormal change in the composition of the liquid may be determined based on the measurement location information in various ways:
- as the location of a measurement at the limit of a cluster;
- as the average of the locations of the measurements at the limit of two neighboring clusters;
- more generally, a combination of the locations of the measurements at the limits of neighboring clusters may be used to locate the anomaly.

The location of a measurement may itself be obtained in various ways.

In one set of embodiments of the invention, a mobile probe such as the probe 100b is equipped with geolocation means, and each measurement is associated with geolocation information. For example, an item of GPS data may be associated with each measurement from the plurality of sensors, thus making it possible to directly obtain the location information for each measurement of said plurality. As indicated above, the geolocation may also be performed via a mobile telephony network, or embedded location systems such as inertial measurement units equipped with accelerometers, a gyroscope and electromagnetometers or through the identification of previously georeferenced characterizable points (view, room) or any other appropriate means.

In one set of embodiments of the invention, geolocation information is not directly available for the measurements of a mobile probe (for example, if the probe is not equipped with geolocation means, or if these are not available during the measurements; for example a GPS beacon might not be able to receive satellite measurements when a mobile probe such as the probe 100b is located in buried pipelines), but each measurement is timestamped, and the location of the measurements is determined on the basis of the path taken by the probe and the timestamp of the measurement.

This makes it possible to locate the abnormal change, even when it is not possible to directly obtain measurement location information, for example in a buried pipeline.

In general, this type of location consists in extrapolating the position of the mobile probe on the basis of the starting time and position, the timestamp of the measurement, the time and the total length of the journey of the probe.

In one set of embodiments of the invention, the location of the measurement is obtained through linear extrapolation, over the journey of the probe, of a ratio between the difference between the timestamp of the measurement and the starting time, and the journey time.

In other words, the timestamp of the measurement makes it possible to determine the period after which the measurement was taken following the start of the journey. It is therefore possible to determine, with knowledge of the total journey time of the probe in the system, whether the measurement was taken halfway through the journey, a third of the journey, 90% of the journey, etc. and to consider locating the measurement, respectively, at a location located midway, a third of the way, 90% of the way, etc.

It is also possible to use more complex associations between the timestamp of the measurements and the location of the abnormal change. For example, a hydraulic model of the system in which the probe moves may be obtained, making it possible to ascertain the flow rates in each pipeline. For example, the applicant has filed a European patent application published under number EP 3 112 959, in which a hydraulic model of a water distribution system is parameterized, thereby making it possible to gain information about the flow rates in each pipeline. Such a hydraulic model may be transposed directly to a collection system. If such a model is known, the movement of the probe in the system may be determined more accurately, and its location may be determined almost exactly, at the time when a given measurement is taken, which is known from its path, and the flow rates of water in each pipeline flowed through.

In one set of embodiments of the invention, a user may select one or more parameters of the method, that is to say at least one parameter for detecting the change in physicochemical composition of the liquid. The parameters able to be chosen by the user may for example be:
- the selection of a subset of types of measurement to be used, from among the available types of measurement/sensor;
- the use or omission of optional steps, such as smoothing the measurements, or the use of PCA;
- the type of data partitioning, and where applicable the partitioning parameters; etc.

More generally, the various parameters able to be contemplated for the method may be defined by a user. To this end, the user may have available a graphical interface allowing said user to define at least one parameter for detecting the change in physicochemical composition of the liquid, and to view the result of the execution of the method.

This therefore allows the user to perform tests in order to identify the most relevant parameter values for executing the method.

FIG. 4 shows a first example of partitioning data from measurements from physicochemical measurement sensors, in one set of modes of implementation of the invention.

The curves 410 represent a series of measurements from a plurality of sensors on one and the same probe in a wastewater collection system:
- the curve 411 represents the evolution of conductivity measurements;
- the curve 412 represents the evolution of temperature measurements;
- the curve 413 represents the evolution of pH measurements;
- the curve 414 represents the evolution of redox measurements.

The curves are synchronized and correspond to measurements taken at the same times. The horizontal axis 420 is a time axis representing the timestamp of the measurements.

In this example, a phase change occurs at the time 421: the change in chemical composition of the water is embodied through rapid changes in the 4 types of measurement simultaneously, defining two time windows 422 and 423, of highly different measurements. It should be noted here that simultaneously using a plurality of probes makes it possible to have a more robust detection, since the change in composition of the water is detected via a simultaneous change in a plurality of physicochemical variables, and not just one.

As explained above, in the method according to the invention, data partitioning is applied to the measurements. In the example of FIG. 4, PCA is also applied, prior to the data partitioning, which is therefore applied to the principal components and not to the raw measurements.

The graph 430 represents the application of the PCA to the time series of measurements 410. For the graph 430, the data have also benefited from a centering-reduction. Density-based partitioning, such as the HDBSCAN algorithm, has been applied. Each point corresponds to a measurement from the set of sensors, in the principal component space.

The graph 430 highlights two separate measurement clusters, respectively 432 and 433. These clusters correspond respectively to the measurement time windows 422 and 423. A set of homogeneous points, corresponding to slow variations, separated by a few more remote points, is clearly observed for each cluster.

In this case, the two measurements at the limits of the clusters are the measurements 4310 and 4311, which correspond to the measurements either side of the time 421.

In one set of embodiments of the invention, the abnormal change may therefore be located at the set of measurements 4310, 4311 or a combination of the two (for example, midway between the location of the measurements 4310 and 4311). As indicated above, the location of the measurements may be obtained in multiple ways, for example if the measurements are geolocated, or by using the timestamp of the measurements to deduce the location of the probe on which the measurements were taken.

FIG. 5 shows a second example of partitioning data from measurements from physicochemical measurement sensors, in one set of modes of implementation of the invention.

More precisely, the graph 500 shows, in 3 dimensions, a set of measurements from a plurality of collocated sensors in a space formed by 3 principal components PC1, PC2 and PC3, represented respectively by the axes 510, 511 and 512.

In the example of the graph 500, density-based data partitioning has also been applied to the principal components. This makes it possible to separate the measurements into two clusters, 520 and 521. In this case too, a high local density of measurements, representative of a gradual evolution of the physicochemical variables, before a sudden change between the clusters, is observed within each cluster. In the example of FIG. 5, a temporary change in the physicochemical composition of the water has occurred, with a first change from a first composition (cluster 520) to a second composition (cluster 521), represented by the limit points of the clusters 530 and 531, and then a second sudden change, from the second composition transition (cluster 521) to the first (cluster 520), represented by the limit points of the clusters 532 and 533.

It may be noted here that the cluster 521 containing the abnormal measurements is located in a region of the principal component space different from the cluster containing the normal measurements 520. It may also be observed that the change of the measurements from the cluster 520 to the cluster 521 is associated with a modification of Principal Components 1 and 2 in the positive direction (i.e. an increase in the values of Principal Components 1 and 2). In this example, in a learning phase, it has been demonstrated that such a modification of the principal components is associated with an industrial discharge.

The invention therefore makes it possible not only to detect anomalies but also, in one set of embodiments of the invention, to characterize them based on the variation direction of the values between the clusters. The variation direction of the values may notably be determined by computing the average of the values of the measurements on each cluster and in each dimension. As an alternative, the median or any other value representative of the overall location of the measurements of the cluster in the measurement space or principal component space may be used. Next, the representative values of each cluster may be compared, and the anomalies may be characterized on the basis of a variation direction, and possibly variation thresholds. The variation directions and thresholds may be determined in a learning phase, for example by an expert user, or a supervised machine learning algorithm.

Detecting the types of anomaly on the basis of a variation direction of the values of measurements between the clusters gives a robust and effective anomaly categorization method. In addition, the detection and the categorization of anomalies are independent of the initial state of the water in the collection system.

The above examples demonstrate the ability of the invention to detect abnormal changes in the composition of a liquid and, for some embodiments, to locate them, and to do so even if the change takes place to a state that has never been encountered before. They are however given only by way of example, and do not in any way limit the scope of the invention, which is defined in the following claims.

The invention claimed is:

1. A computer-implemented method for detecting a change in physicochemical composition of a liquid, comprising:
   receiving time series of measurements from a plurality of collocated sensors for sensing physicochemical variables of said liquid by means of at least one communication link;
   applying data partitioning to the time series of measurements;
   checking for a presence of at least two measurement clusters;
   if at least two measurement clusters are present, detecting the presence of an abnormal change in the physicochemical composition of the liquid;
   otherwise, detecting an absence of an abnormal change in the physicochemical composition of the liquid;

the above-mentioned steps being performed with a processor; and if an abnormal change is detected, undertaking additional analysis and/or corrective actions regarding this change.

2. The computer-implemented method as claimed in claim 1, comprising smoothing the measurements.

3. The computer-implemented method as claimed in claim 1, comprising principal component analysis of the measurements.

4. The computer-implemented method as claimed in claim 3, wherein the principal component analysis comprises multiplying a measurement matrix by a centering-reduction matrix, and then by a transformation matrix, and wherein at least one of the centering-reduction and transformation matrices was computed in a training phase based on measurements from said plurality of sensors.

5. The computer-implemented method as claimed in claim 1, wherein applying the data partitioning comprises applying a density-based partition.

6. The computer-implemented method as claimed in claim 1, wherein applying the data partitioning comprises applying a first data partitioning method and, if the first method does not manage to partition the measurements into at least two clusters, applying a second data partitioning method different from the first one.

7. The computer-implemented method as claimed in claim 6, wherein the first method is a local density-based data partitioning method, and the second method is centroid-based.

8. The computer-implemented method as claimed in claim 1, comprising, if the presence of an abnormal change is detected, categorizing the abnormal change before undertaking the additional analysis and/or corrective actions.

9. The computer-implemented method as claimed in claim 8, wherein the category of the abnormal change is determined on the basis of a variation direction of the values of the measurements between each of the at least two measurement clusters.

10. The computer-implemented method as claimed in claim 1, comprising, if the presence of an abnormal change is detected, locating the abnormal change before undertaking the additional analysis and/or corrective actions.

11. The computer-implemented method as claimed in claim 10, wherein the location of the abnormal change is determined on the basis of a location of at least one measurement positioned, by the data partitioning, at the limit between two clusters.

12. The computer-implemented method as claimed in claim 11, wherein the plurality of sensors are located in a mobile probe, the measurements are timestamped, and said location of a measurement is obtained on the basis of the path taken by the probe in the liquid and the timestamp of the measurement.

13. The computer-implemented method as claimed in claim 12, wherein the location of the measurement is obtained through linear extrapolation, over the journey of the probe, of a ratio between the difference between the timestamp of the measurement and the starting time, and the journey time.

14. The computer-implemented method as claimed in claim 1, wherein the plurality of sensors comprises at least one sensor chosen from a group comprising:

a conductivity sensor;

a temperature sensor;

a pH sensor; and an oxidoreduction potential sensor.

15. The computer-implemented method as claimed in claim 14, wherein the plurality of sensors comprises:

a conductivity sensor; and a temperature sensor.

16. The computer-implemented method as claimed in claim 1, wherein the plurality of sensors are collocated in a mobile probe.

17. The computer-implemented method as claimed in claim 16, wherein the mobile probe is a ball float.

18. A device for detecting a change in physicochemical composition of a liquid, comprising:

at least one communication link to a plurality of collocated sensors for sensing physicochemical variables of said liquid; and a processor configured so as to execute the respective steps of a method as claimed in claim 1.

19. A probe for detecting a change in physicochemical composition of a liquid, said probe comprising:

a plurality of sensors for sensing physicochemical variables of said liquid; and at least one communication link to a device as claimed in claim 18.

20. The probe as claimed in claim 19, said probe being designed to float in the liquid.

21. A system for detecting a change in physicochemical composition of a liquid, comprising:

a device for detecting the change in physicochemical composition of the liquid, comprising at least one communication link to a plurality of collocated sensors for sensing physicochemical variables of said liquid, and a processor configured so as to execute the respective steps of a method as claimed in claim 1; and at least one probe comprising the plurality of sensors and a communication link to said device.

22. The system as claimed in claim 21, comprising a graphical interface allowing a user to define at least one parameter for detecting the change in physicochemical composition of the liquid.

23. A computer program product for detecting a change in physicochemical composition of a liquid, comprising program code instructions recorded on a computer-readable medium for executing a method as claimed in claim 1 when said program product is executed on a computer.

* * * * *